United States Patent [19]
Benoit

[11] Patent Number: 6,138,319
[45] Date of Patent: Oct. 31, 2000

[54] COVER AND WIPER FOR A REAR VEHICLE LIGHT

[76] Inventor: Robert J. Benoit, 154 Carter Blvd., P.O. Box 196, North Cobalt, Ontario, Canada, P0J 1R0

[21] Appl. No.: 09/186,195

[22] Filed: Nov. 4, 1998

[51] Int. Cl.[7] .................. B60S 1/56; B60S 1/60
[52] U.S. Cl. .................. 15/250.01; 15/250.001; 15/250.1; 362/376; 362/457
[58] Field of Search ............ 15/250.001, 250.002, 15/250.22, 250.01, 250.1, 250.003, 256.5, 256.51; 362/497, 498, 499, 540, 541, 552, 376, 457, 458

[56] References Cited

U.S. PATENT DOCUMENTS

| | | | |
|---|---|---|---|
| 3,289,237 | 12/1966 | Lindsey | 15/250.002 |
| 3,310,669 | 3/1967 | Dils | 15/250.002 |
| 3,612,647 | 10/1971 | Laprairie | 15/250.003 |
| 3,659,307 | 5/1972 | Vitou | 15/250.002 |
| 3,913,166 | 10/1975 | Morrison | 15/250.002 |
| 4,080,685 | 3/1978 | Vanderpool | 15/250.002 |

*Primary Examiner*—Gary K. Graham
*Attorney, Agent, or Firm*—Freedman & Associates

[57] ABSTRACT

A device for externally covering a rear vehicle light for protection from obscuring snow or dirt is provided. The device comprises a support structure to position a transparent cylindrical cover over a rear vehicle light. The cover is rotated by an electric motor. Also affixed to the support structure are upper and lower wiper blades in contact with the surface of the cover. While the cover is rotating light diminishing dirt and slush is scraped off the cover surface by the wiper blades.

16 Claims, 4 Drawing Sheets

COVER AND WIPER FOR A REAR VEHICLE LIGHT

FIELD OF THE INVENTION

This invention relates to the protection of illumination devices from light diminishing debris such as snow or dirt, and in particular to a device for externally covering a rear vehicle light for protection.

BACKGROUND OF THE INVENTION

Roads often become hazardous to drive in bad weather conditions such as rain or snow. Rear vehicle lights are diminished by accumulating road debris such as dirt and slush picked up by the rear vehicle wheels and distributed in the air wake of a car. Often, in such conditions, the rear lights are completely covered by dirt and slush. Thus the rear vehicle lights are not seen by the following traffic. Not visible rear vehicle lights are a major cause of accidents in bad weather conditions, because a vehicle is recognized by the following traffic too late or the braking lights or the turning lights are not seen. This problem is further exacerbated in transport trucks and buses. However, the very need to pull off the road under such conditions, to clean the lights and to return back on the road puts a driver at risk.

A large number of cleaning systems for vehicle lights and mirrors have been disclosed in the prior art. These include ultrasonic vibration to clear water from mirrors, pivoting oscillating wipers, track guided oscillating wipers, propeller driven wipers as described in U.S. Pat. Nos. 3,887,955; 3,608,123; and 3,076,990. All these cleaning systems have in common that they are very complex. Therefore, these systems are expensive and difficult to install.

U.S. Pat. No. 5,068,770 issued to Baziuk in 1991 discloses a spherical cover surrounding the headlight and supporting a pair of wipers which clean the surface as the cover is rotated. Due to its complexity, for example to ensure safe electrical connection through the rotating spherical cover to the light, this device must be built into the vehicle structure. It is not possible to use this device as a retrofit or to remove it after temporary use. Furthermore, containing the light within the spherical cover necessitates disassembling the device for bulb replacement.

It is an object of the invention to provide a device for protecting a rear vehicle light. It is further an object of this invention to provide a device for protecting a rear vehicle light that is easily installed and can be removable.

SUMMARY OF THE INVENTION

The present invention has found that a simple and effective protective cover for rear vehicle lights can be formed by providing an external cover and associated wiper with a drive to provide relative movement between them to remove snow or other debris. Conveniently a cover is formed as a transparent cylinder supported for rotational movement against a stationary wiper blade. The device can also be used as a retrofit or removed after temporary use.

In accordance with the invention there is provided, a device for externally covering a rear vehicle light for protection comprising:
  a transparent cover for covering the rear light for preventing accumulation of debris on the rear light;
  a wiper blade in contact with a surface of the cover for scraping debris off the cover;
  a support structure to position the cover over a rear vehicle light, the support structure supporting relative movement between the cover and the wiper blade; and,
  drive means for imparting a relative movement between the cover and the wiper blade.

In accordance with the invention there is also provided, a device for externally covering a rear vehicle light for protection comprising:
  a transparent cylindrical cover for covering an external portion of the rear light preventing accumulation of debris on the rear light;
  a wiper blade in contact with a surface of the cover for scraping debris off the cover;
  a support structure to position the cover over a rear vehicle light, the support structure supporting the cylindrical cover for rotational movement in contact with the wiper blade; and,
  drive means for imparting a rotating movement of the cylindrical cover about its longitudinal axis causing the wiper to pass over the surface of the cylindrical cover.

In accordance with the invention there is provided, a device for externally covering a rear vehicle light for protection comprising:
  a transparent cylindrical cover for covering an external portion of the rear light preventing accumulation of debris on the rear light;
  a lower wiper blade in contact with a surface of the cover for scraping debris off the cover and for preventing ingress of debris to the light;
  an upper wiper blade in contact with a surface of the cover for preventing ingress of debris to the light;
  a housing to position the cover over a rear vehicle light and substantially enclosing the rear vehicle light with the cover, the housing supporting the cylindrical cover for rotational movement in contact with the upper and the lower wiper blade;
  an electric motor for imparting a unidirectional rotating movement of the cylindrical cover about its longitudinal axis causing the upper and the lower wiper to pass over the surface of the cylindrical cover; and
  a control for controlling the operation of the electric motor.

In accordance with the invention there is provided, a device for externally covering a rear vehicle light for protection comprising:
  a transparent cover for covering an external portion of the rear light preventing accumulation of debris on the rear light;
  a wiper blade in contact with a surface of the cover for scraping debris off the cover;
  a support structure to position the cover over a rear vehicle light, the support structure supporting the cover and the wiper blade; and,
  drive means for imparting a movement of the wiper blade.

Advantageously, the device according to this invention is very simple, inexpensive to manufacture, and reliable in operation under bad weather conditions. Further advantageously, the device according to this invention is easily installed and, in an embodiment, easily removed.

BRIEF DESCRIPTION OF THE DRAWINGS

Exemplary embodiments of the invention will now be described in conjunction with the drawings, in which:

FIG. 5a shows a front view of an embodiment of a device according to the invention for protecting a rear vehicle light, the device comprising a cover plate and a moving wiper blade; and, FIG. 5b shows a side view of the embodiment of FIG. 5a.

DETAILED DESCRIPTION

Figure 1:
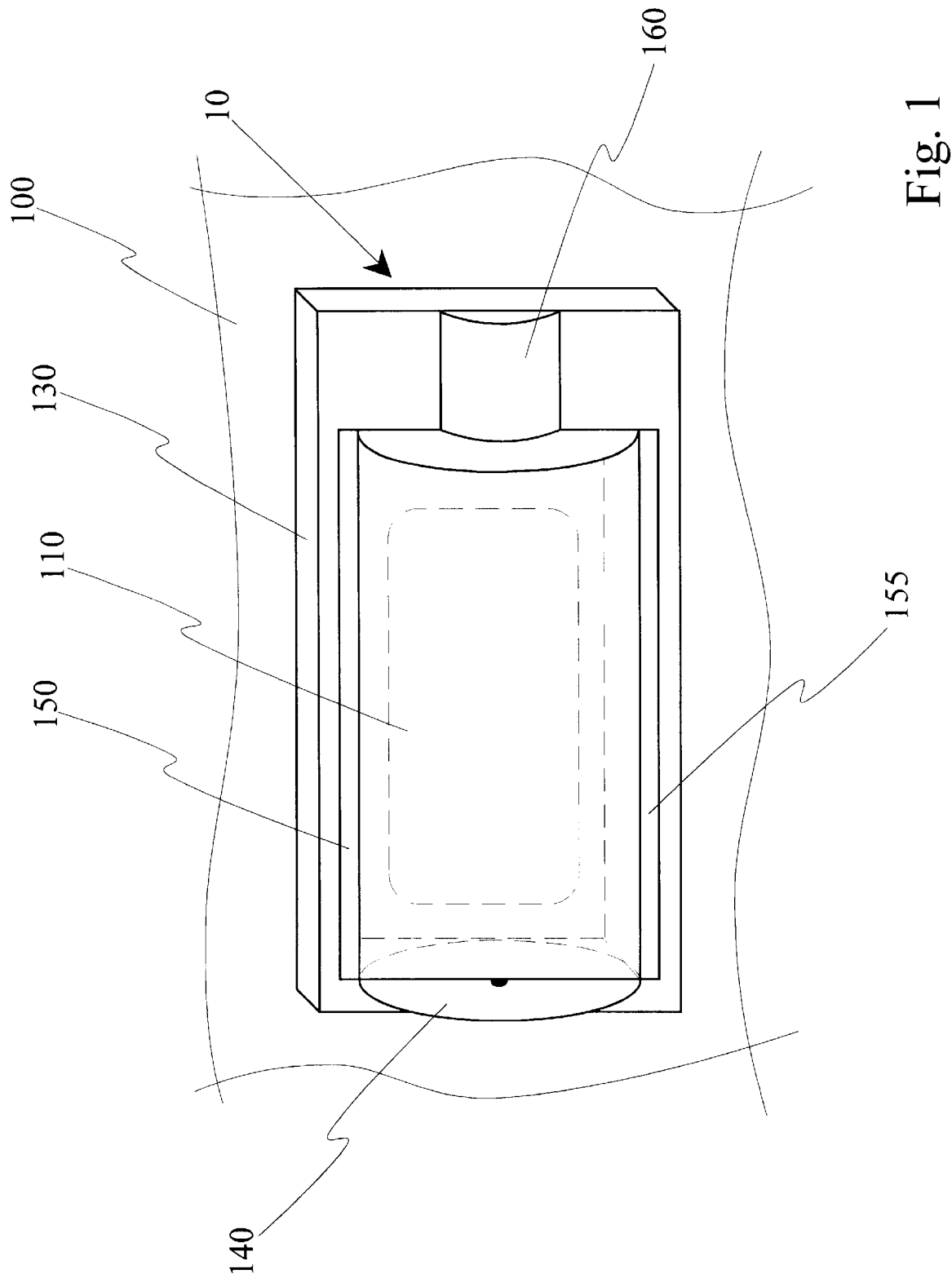
FIG. 1 shows a front view of a device according to the invention for protecting a rear vehicle light, the device comprising a cylindrical cover.

Referring to FIG. 1, a schematic view shows the construction of a preferred embodiment according to the invention 10 mounted in place on a vehicle. To the rear 100 of a vehicle, a housing 130 of a device according to the invention is mounted to protect a rear light 110, substantially enclosing the light from the external environment. The housing 130 supports a transparent cylindrical cover 140 for rotational movement about its longitudinal axis. The transparent cylindrical cover 140 is rotated by drive means 160, such as an electric motor or a pneumatic drive. A pneumatic drive is advantageous for a trailer where it is connected to the air supply of the air braking system and does not need an additional electrical connection from a tractor to the trailer. An upper wiper blade 150 and a lower wiper blade 155 are affixed to the housing 130 such that they are in contact with the surface of the transparent cylindrical cover 140.

Figure 2:
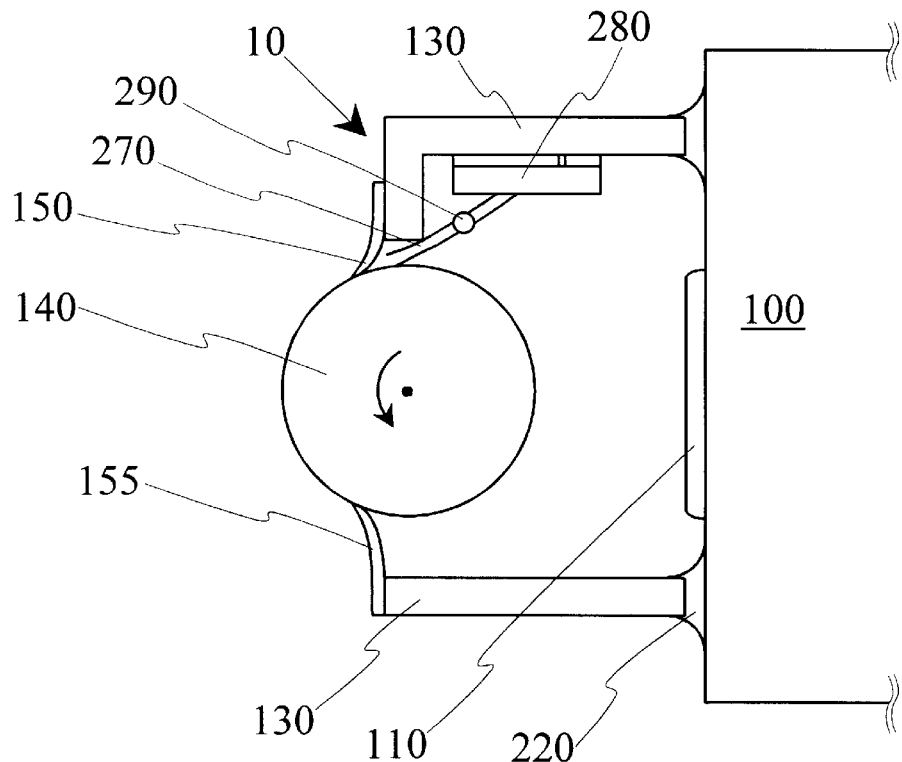
FIG. 2 shows a side view of the device shown in FIG. 1.

FIG. 2 shows a side view of the same device 10. A transparent cylindrical cover 140 is supported by a housing 130 affixed to a rear 100 of a vehicle covering a rear light 110. A seal 220 between the housing 130 and the rear of a vehicle 100 and the wiper blades 150 and 155 prevents significant ingress of debris to the light 110. While the cover 140 is rotating, for example counterclockwise as shown in FIG. 2, debris is scraped off the surface of the cover 140 by the lower wiper blade 155 while the upper wiper blade 150 prevents debris from entering the space between the cover 140 and the rear light 110. The counterclockwise rotation as indicated in FIG. 2 is preferred because dirt and slush scraped off by the lower wiper blade 155 falls down and thus the cover 140 is kept clean.

FIG. 2 also shows a conduit 270 and a pump 290 for providing a cleaning fluid out of a container 280 which is affixed to the housing 130 of the device. The cleaning fluid is provided to the surface of the cover 140 close to the upper wiper blade 150. While rotating the cover 140 the cleaning fluid is then distributed over the length of the cover along the upper wiper blade 150.

A control of the drive means 160 allows continuous operation or in intervals, for example once every minute. In another embodiment according to this invention the cover 140 is rotated in an oscillating motion. The realization of an oscillating motion is well known in the prior art, for example reversing the electrical current provided to the electric motor or using a mechanical gear. The device 10 also allows for the implementation of heating elements, such as a heating wire within the cover or heating of the conduit exit to prevent icing. Heating elements are well known in the prior art.

The preferred embodiment of a device 10 according to this invention results in a very simple and reliable solution for protecting rear vehicle lights. There is no complicated mechanism needed to move the wiper blades, or to control tension across the wiper blades, which is often a source of trouble due to malfunctioning or ice blocking the movement of the mechanism. Moving parts in this device comprise only bearings for the cylinder and a drive. Therefore this device is inexpensive to manufacture and reliable in operation under bad weather conditions. Another advantage of rotating the cover 140 is that the view on the rear light 110 is not obstructed by a moving wiper blade.

As seen in FIGS. 1 and 2 the device 10 according to this invention is affixed to the rear of a vehicle 100 covering a rear light 110. Thus the installation of a device according to this invention needs only externally mounting of the housing 130 and connecting to the electric or the pneumatic system of a vehicle, which makes it suitable for temporary or retrofit use. Of course, the installation of the device 10 is not restricted to an externally mounting as shown in FIG. 2, but it also enables a manufacturer to install the device as an integral part of the rear of a vehicle.

In another embodiment according to this invention the device further comprises energy storage means such as a battery. The battery is either fixed to the housing 130 or separate and connected to the drive by a cable. Such a battery operated device is highly advantageous for use with tractors and trailers. There is no need for any wiring, the device is just externally mounted to the rear of a trailer covering the rear lights and is removed when the trailer is at the destination. Then the device is affixed to the tractor or another trailer.

Figure 3:
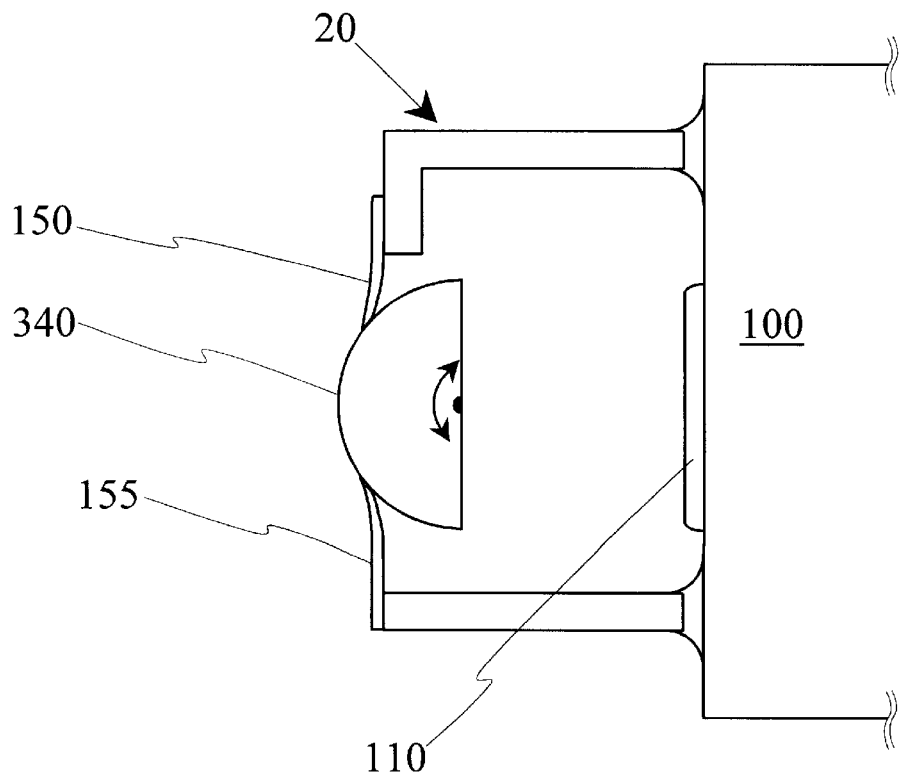
FIG. 3 shows a side view of a further embodiment of a device according to the invention for protecting a rear vehicle light, the device comprising a half cylindrical cover.

FIG. 3 shows a side view of another embodiment of a device 20 according to this invention. A transparent cover 340 comprising a partial cylinder is positioned to cover a rear light 110. While rotating in an oscillating motion dirt and slush is scraped off by the upper wiper blade 150 and the lower wiper blade 155 respectively. Using a cover 340 comprising a partial cylinder this embodiment provides a more compact device than the embodiment shown in FIGS. 1 and 2 but it necessitates means to provide an oscillating motion.

Figure 4:
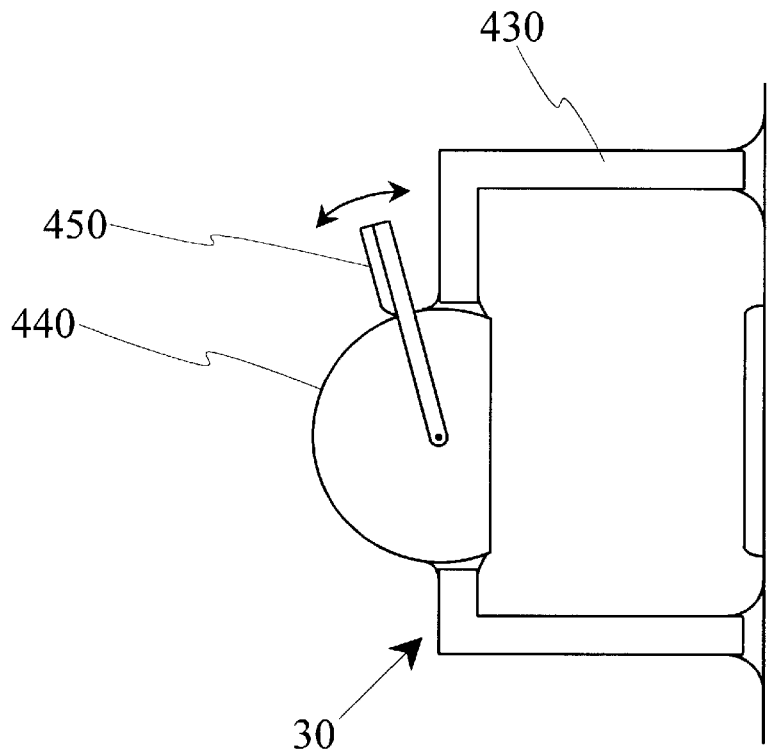
FIG. 4 shows a side view of an embodiment of a device according to the invention for protecting a rear vehicle light, the device comprising a resting cover and moving wiper blades.

In yet another embodiment of a device 30 according to this invention, shown in FIG. 4, a transparent cover 440 comprising a partial cylinder is resting in a housing 430 and a wiper blade 450 is moved in an oscillating motion to scrape off debris accumulated on the cover surface.

Figure 5B:
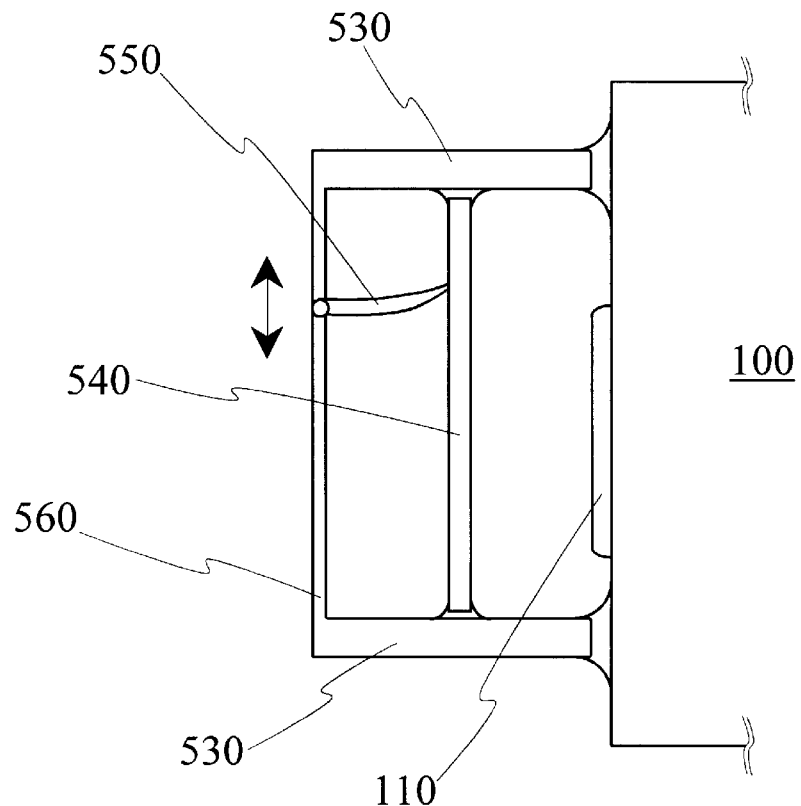
Figure 5A:
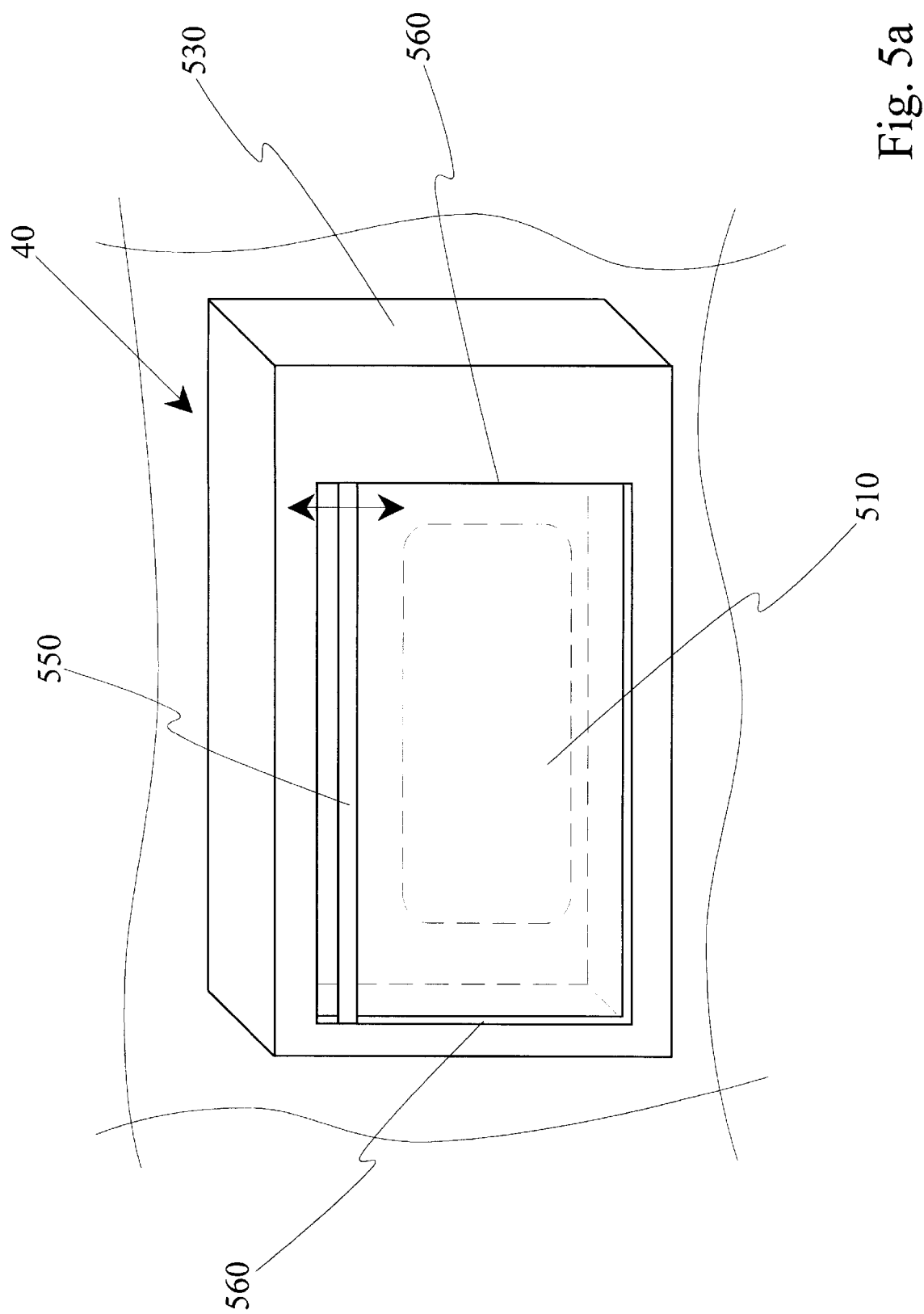

FIG. 5 shows another embodiment of a device 40 according to the invention. A housing 530 with a transparent cover 540 is affixed to the rear of a vehicle 100 covering a rear light 110, wherein the transparent cover comprises a plate. Debris is scraped off the cover 540 by the moving wiper blade 550 (see FIGS. 5a and 5b) which is guided in parallel tracks 560 by an oscillating drive.

Of course, numerous other embodiments may be envisaged without departing from the spirit and scope of the claimed invention.

What is claimed is:

1. A device for externally covering a rear vehicle light for protection comprising:

a transparent movable cover for covering the rear light for preventing accumulation of debris on the rear light;

a stationary wiper blade in contact with a surface of the cover for scraping debris off the cover, a support structure to position the cover over a rear vehicle light, the support structure supporting relative movement between the cover and the wiper blade; and, drive means for imparting a relative movement between the cover and the wiper blade.

2. A device for externally covering a rear vehicle light for protection according to claim 1, wherein the moving cover comprises a cylinder rotating about its longitudinal axis.

3. A device for externally covering a rear vehicle light for protection according to claim 1, wherein the moving cover comprises a partial cylinder rotating about its longitudinal axis in an oscillatory motion.

4. A device for externally covering a rear vehicle light for protection comprising:
- a transparent cylindrical cover for covering an external portion of the rear light preventing accumulation of debris on the rear light;
- a wiper blade in contact with a surface of the cover for scraping debris off the cover; a support structure to position the cover over a rear vehicle light, the support structure
- supporting the cylindrical cover for rotational movement in contact with the wiper blade; and,
- drive means for imparting a rotating movement of the cylindrical cover about its longitudinal axis causing the wiper to pass over the surface of the cylindrical cover.

5. A device for externally covering a rear vehicle light for protection according to claim 4, wherein the cylinder rotates in one direction.

6. A device for externally covering a rear vehicle light for protection according to claim 4, wherein the support structure comprises a housing for substantially enclosing the rear vehicle light with the cover.

7. A device for externally covering a rear vehicle light for protection according to claim 4, further comprising an energy storage device.

8. A device for externally covering a rear vehicle light for protection according to claim 4, further comprising an apparatus for applying a cleaning fluid to the surface of the cover.

9. A device for externally covering a rear vehicle light for protection according to claim 4, wherein the drive comprises a pneumatic drive.

10. A device for externally covering a rear vehicle light for protection according to claim 4, wherein the drive comprises an electric motor.

11. A device for externally covering a rear vehicle light for protection according to claim 10, wherein the electric motor operates continuously.

12. A device for externally covering a rear vehicle light for protection according to claim 10, wherein the electric motor operates in intervals.

13. A device for externally covering a rear vehicle light for protection comprising:
- a transparent cylindrical cover for covering an external portion of the rear light preventing accumulation of debris on the rear light;
- a lower wiper blade in contact with a surface of the cover for scraping debris off the cover and for preventing ingress of debris to the light;
- an upper wiper blade in contact with a surface of the cover for preventing ingress of debris to the light;
- a housing to position the cover over a rear vehicle light and substantially enclosing the rear vehicle light with the cover, the housing supporting the cylindrical cover for rotational movement in contact with the upper and the lower wiper blade;
- an electric motor for imparting a unidirectional rotating movement of the cylindrical cover about its longitudinal axis causing the upper and the lower wiper to pass over the surface of the cylindrical cover; and
- a control for controlling the operation of the electric motor.

14. A device for externally covering a rear vehicle light for protection according to claim 13, wherein the control controls intermittent operation of the electric motor.

15. A device for externally covering a rear vehicle light for protection according to claim 13, further comprising a battery.

16. A removable device for externally covering a rear vehicle light for protection comprising:
- a transparent cover for covering an external portion of the rear light for preventing accumulation of debris on the rear light, wherein the cover comprises a partial cylinder;
- a wiper blade in contact with a surface of the cover for scraping debris off the cover;
- a support structure to position the cover over a rear vehicle light, the support structure supporting the cover and the wiper blade; and,
- drive means for imparting a movement of the wiper blade.

* * * * *